(12) United States Patent
Herchenbach et al.

(10) Patent No.: US 6,719,636 B2
(45) Date of Patent: Apr. 13, 2004

(54) CENTERED DOUBLE UNIVERSAL JOINT

(75) Inventors: Paul Herchenbach, Ruppichteroth (DE); Martin Hector, Seigburg (DE)

(73) Assignee: GKN Walterscheid GmbH (DE)

( * ) Notice: Subject to any disclaimer, the term of this patent is extended or adjusted under 35 U.S.C. 154(b) by 24 days.

(21) Appl. No.: 10/133,291

(22) Filed: Apr. 25, 2002

(65) Prior Publication Data

US 2002/0187840 A1 Dec. 12, 2002

(30) Foreign Application Priority Data

Apr. 26, 2001 (DE) .......................... 101 20 432

(51) Int. Cl.[7] ................................. F16D 3/30
(52) U.S. Cl. .................... 464/118; 464/905
(58) Field of Search ................ 464/116–119, 904, 464/905; 403/135, 143

(56) References Cited

U.S. PATENT DOCUMENTS

| 3,470,712 | A |   | 10/1969 | Geisthoff et al. |
| 3,792,597 | A | * | 2/1974 | Orain ................ 464/118 |
| 4,650,439 | A | * | 3/1987 | Mayhew ............ 464/118 X |
| 4,997,407 | A |   | 3/1991 | Kretschmer et al. |
| 5,453,052 | A | * | 9/1995 | Harz et al. |
| 6,139,435 | A |   | 10/2000 | Cornay |
| 2003/0017875 | A1 | * | 1/2003 | Herchenbach et al. ...... 464/118 |
| 2003/0017876 | A1 | * | 1/2003 | Herchenbach et al. ...... 464/118 |

FOREIGN PATENT DOCUMENTS

| FR | 818 717 | 10/1937 |
| GB | 1 208 589 | 10/1970 |
| HU | 207 147 B | 6/1990 |
| SE | 356 645 | 8/1961 |

* cited by examiner

Primary Examiner—Greg Binda
(74) Attorney, Agent, or Firm—Harness, Dickey & Pierce, P.L.C.

(57) ABSTRACT

A centered double universal joint has a first outer joint yoke (1) carrying a first cylindrical bearing journal (4). A unit including a first bearing ball (6) and a first bearing race (25) are secured on the journal (4). Via a cylindrical outer face (33), first bearing race (25), the unit is positioned in a bearing bore (24) of a guiding projection (23) of a guiding disc (22). Accordingly, a surface to surface contact is achieved between the cylindrical outer face (33) and the bearing bore (24) as well as between the hollow spherical bore (32) of the bearing race (26) and the spherical outer face (17) of the bearing ball (16). The other outer joint yoke is provided with a similar bearing ball and a bearing race arrangement.

6 Claims, 2 Drawing Sheets

CENTERED DOUBLE UNIVERSAL JOINT

RELATED APPLICATION

This application claims priority to German Patent Application No. 10120432.9-12 filed Apr. 26, 2001, which application is herein expressly incorporated by reference.

FIELD OF THE INVENTION

The invention relates to a centered double universal joint, especially for driving, or for drives in, agricultural implements and tractors.

BACKGROUND OF THE INVENTION

U.S. Pat. No. 3,470,712 describes a centered double universal joint. Two outer joint yokes are each articulatably connected via a cross member to two inner joint yokes. Each inner joint yoke is provided with a bearing housing portion. The bearing housing portions are bolted to one another. The bearing housing portions delimit an annular guiding recess which radially displaceably supports a guiding disc. Floatingly arranged annular guiding plates are provided between both sides of the guiding plates and the inner joint yokes in the guiding recess. The guiding disc has a centrally arranged guiding projection which, on both sides, projects from the guiding disc. A bore starts from each end face of the guiding projection. The bore is initially cylindrical and then hollow-spherical. The outer joint yoke arms of each outer joint yoke are connected to one another by a welded-in bridge. Each bridge has a journal projection with a spherical face that engages the associated bearing bore of the guiding projection of the guiding disc. At high torque values and large articulation angles, this design leads to a concentrated load. Thus, the concentrated load leads to an increase in wear in the region of contact between the spherical journal, associated with the bridge, and the respective cylindrical bearing bore which is engaged by the spherical journal. The purpose of the above-described centring means is to control the connected universal joints onto half the articulation angle between an input shaft and an output shaft in order to achieve constant velocity. If wear leads to play, the relationship is disturbed.

SUMMARY OF THE INVENTION

It is an object of the present invention to provide a centered double universal joint which ensures accurate control of the universal joints that form the double universal joint onto half the articulation angle. This achieves a long service life.

In accordance with the invention, a centered double universal joint comprises: A first outer joint yoke has first yoke arms and a first bridge that connects the two first yoke arms. The first bridge carries a first cylindrical bearing journal. A first inner joint yoke includes a first bearing housing portion. A first cross member articulatably connects the first outer joint yoke to the first inner joint yoke. A second outer joint yoke has second yoke arms and a second bridge that connects the two second yoke arms. The second bridge carries a second cylindrical bearing journal. A second inner joint yoke includes a second bearing housing portion. The second bearing housing portion is connected to the first bearing housing portion and forms an annular guiding recess. A second cross member articulatably connects the second outer joint yoke to the second inner joint yoke. A guiding disc has a central guiding projection which projects on both sides of the guiding disc towards the first and the second bearing journal. The guiding projection has a continuous cylindrical bearing bore. The two bearing journals extend into the bearing bore from different ends. The guiding disc is adjustable in the guiding recess. A bearing ball is on each bearing journal. The bearing ball has the shape of an outer spherical zone and has a through-bore. The through-bore enables the bearing ball to be positioned on the bearing journal. The bearing ball is held at least axially with reference to the axis of the bearing journal. The bearing ball has a spherical outer face. A bearing race for each bearing ball is supported in the cylindrical bearing bore. The bearing race supports the spherical outer face of the bearing ball. The bearing race includes a corresponding hollow spherical bore that enables the bearing ball to pivot in all directions. The bearing race and the bearing ball form a preassembled unit. The bearing race has a cylindrical outer face which is adjustably positioned in the cylindrical bearing bore of the guiding disc.

An advantage of this design is that a lower surface pressure and, in consequence, greatly reduced wear is achieved between the guiding disc bearing bore and the bearing race, on the one hand, and between the bearing race and the bearing ball, on the other hand. This is achieved by a surface to surface contact between the conforming surfaces. In addition, it is possible to provide at least one of the components with a friction-reducing coating or to produce it from a material with advantageous friction value. The bearing ball and the bearing race can be pre-assembled to form one unit. The bearing ball and race are then connected to the associated bearing journal of the outer joint yoke. Finally, the inner joint yoke can be assembled with the cross member and the outer joint yoke. These units can then be connected to the guiding disc.

According to a further embodiment of the invention, the bearing race is formed as one piece and the bearing ball is pressed into the hollow-spherical bore in the bearing race. The axis of the through-bore extends perpendicular relative to the longitudinal axis of the cylindrical outer face of the bearing race. To achieve as large a joint articulation angle as possible, the bearing race is axially delimited by two end faces. The bearing race defines a longitudinal axis on which the cylindrical outer face is centered. The hollow-spherical bore is axially and eccentrically arranged between the two end faces. This embodiment is additionally advantageous since the process of fitting the bearing ball in the bearing race has been facilitated. This is due to, towards one end face, a larger aperture is obtained in the bearing race relative to the hollow-spherical bore.

The two bearing housing portions are preferably bolted to one another. Accordingly, a releasable unit is obtained which enables the exchange of components. However, it is also possible to connect the two bearing housing portions to one another after assembly, using a material-locking connection, such as a low-heat welding process. To achieve the largest possible articulation angle and to keep the amount of wear in the bearing region of the guiding disc in the guiding recess to a minimum, annular guiding plates are arranged in the annular guiding recess on both sides of the guiding disc. Also, the guiding recess is closed on the radial outside and open on the radial inside. Further, the outer diameter of the guiding plates is greater than the inner diameter of the guiding recess and smaller than the greatest diameter of the guiding recess. Furthermore, the inner diameter of the guiding plates is greater than the outer diameter of the guiding projection of the guiding disc and smaller than the outer diameter of the guiding disc.

An advantageous situation, with respect to strength, is achieved if the bridge forms an integral part of the associated outer joint yoke.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
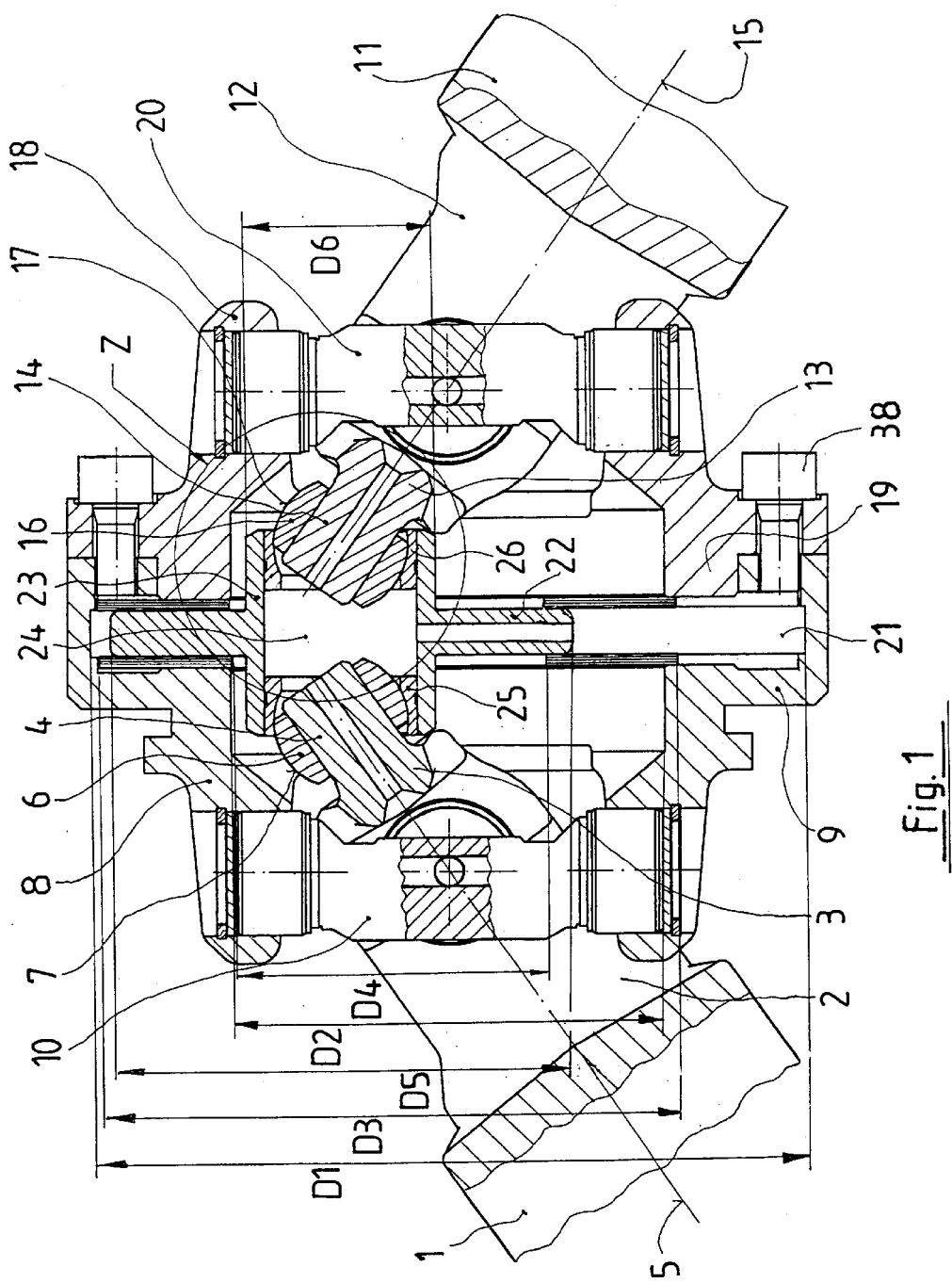
FIG. 1 is a side view, partially in section, of an inventive double universal joint.

FIG. 1 illustrates a double universal joint with two individual universal joints which are connected to one another by a centring mechanism in accordance with the invention. Both joints each accommodate half the articulation angle when an input shaft is articulated relative to an output shaft in order to ensure constant velocity conditions. The two individual joints are substantially identical in design.

The double universal joint according to FIG. 1 comprises a first outer joint yoke 1 with two first yoke arms 2 connected to one another at their free ends by a first bridge 3. The first bridge 3 carries a first bearing journal 4. The first bearing 4 journal defines an axis 5 and has a cylindrical outer face. A first bearing ball 6, with a spherical zone shape, is non-displaceably held on the first bearing journal 4 along the first axis 5. The spherical outer face of the first bearing ball 6 is given the reference number 7. The first outer joint yoke 1 is articulatably connected to the first inner joint yoke 8 by a first cross member 10. Via its two yoke arms 2, the first inner joint yoke 8 is integrally formed onto the first bearing housing portion 9.

The second joint includes a second outer joint yoke 11 with two second yoke arms 12 of which, again, only one yoke arm 12 is visible. The two second yoke arms 12 are connected to one another by a second bridge 13. The second bridge 13 carries a second bearing journal 14. The second bearing journal 14 has a cylindrical outer face and is centered on the second axis 15. A second bearing ball 16 is non-displaceably held on the second bearing journal 14 along the second axis 15. The second bearing ball 16 includes a second spherical outer face 17. The second outer joint yoke 11 is articulatably connected to the yoke arms of a second inner joint yoke 18 by a second cross member 20. The yoke arms of the second inner joint yoke 18 are being integral with a second bearing housing portion 19.

The first bearing housing portion 9 and the second bearing housing portion 19 are removably connected to one another by bolts 38. The two bearing housing portions 9, 19, together, form an annular guiding recess 21. The guiding recess 21 is closed on the radial outside and open on the radial inside. A guiding disc 22 is radially adjustably received together with guiding plates 27 arranged on both sides of guiding disc 22 in the guiding recess 21. The diameters D1 to D6 of the two annular guiding plates 27 of the guiding disc 22 and of the guiding recess 21 are adjusted to one another such that it is possible to carry out the adjustment of the guiding disc 22 in the annular guiding recess 21. The diameters D1 to D6 are set according to the adjustment necessitated by the articulation requirement, and to hold the guiding disc 22 securely held in the recess 21.

In consequence, the diameter D1 of the guiding recess 21 is greater than the outer diameter D3 of the two annular guiding plates 27 and greater than the outer diameter D5 of the guiding disc 22. The inner diameter D4 of the two annular guiding plates 27, however, is smaller than the outer diameter D5 of the guiding disc 22. The guiding disc 22 includes a guiding projection 23. A cylindrical bearing bore 24 is provided in the guiding projection 23. The guiding projection 23 projects from the planar faces on both sides of the guiding disc 22. For this reason, the smallest diameter D2 of the annular guiding recess 21 is greater than the outer diameter D6 of the guiding projection 23. Furthermore, the inner diameter D4 of the annular guiding plates 27 has to be greater than the outer diameter D6 of the guiding projection 23.

A first bearing race 25 is positioned on the first bearing ball 6. The hollow spherical bore of the first bearing race 25 is adapted to the spherical outer face 7 of the first bearing ball 6. The first bearing race 25 includes a cylindrical outside which is displaceably guided in the bearing bore 24 of the guiding projection 23. The second bearing ball 16, by its second spherical outer face 17, is received in a corresponding hollow-spherical bore of a second bearing race 26. The second bearing race 26, via its cylindrical outer face, is also displaceably received in the bearing bore 24 of the guiding projection 23.

Figure 2:
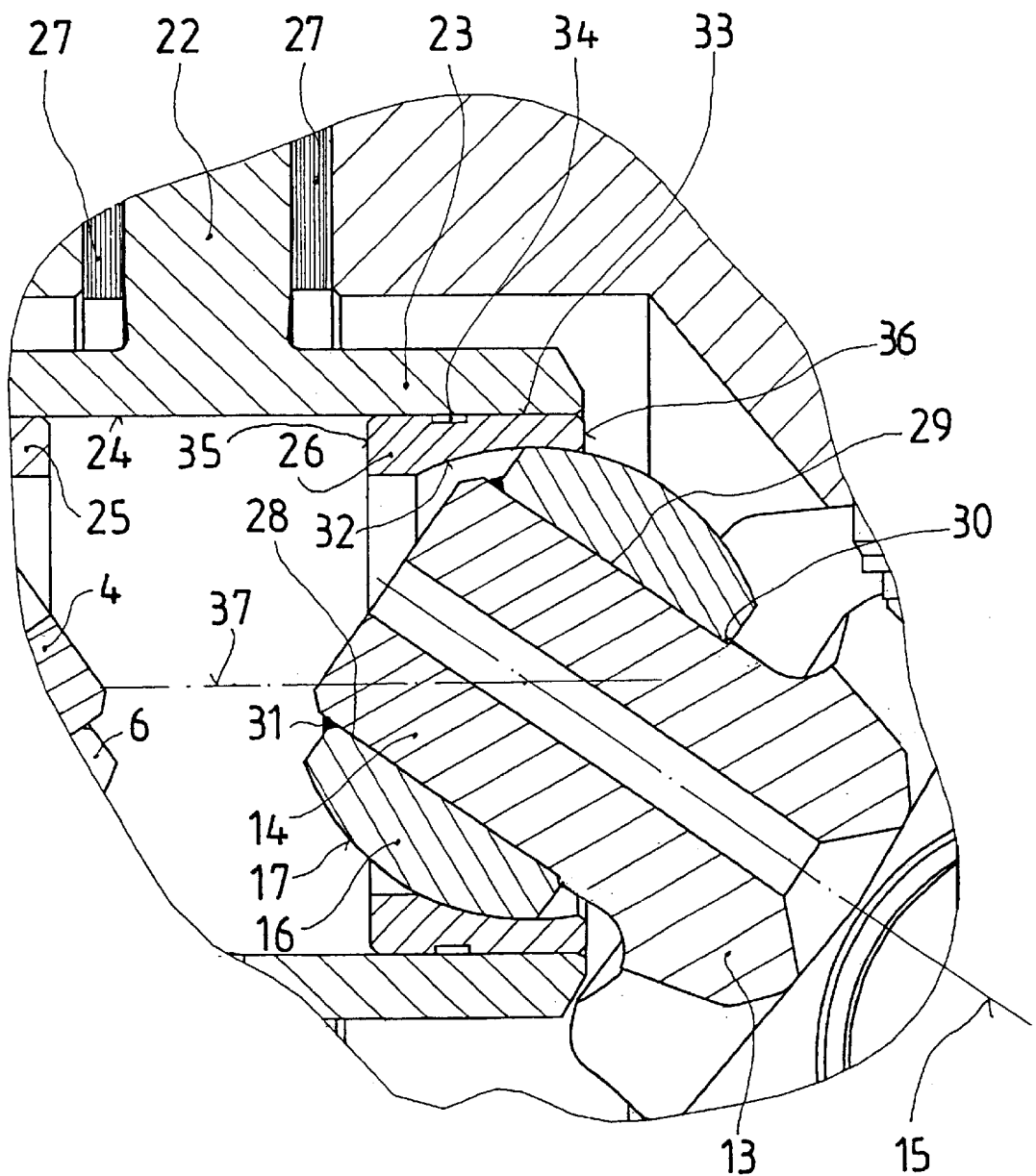
FIG. 2 is an enlarged section view of a detail Z of FIG. 1.

FIG. 2 is in an enlarged view of the second bearing ball 16 arranged on the second bearing journal 14. The second bearing ball 16 is provided with a cylindrical through-bore 28. The second bearing race 26 together with the second bearing ball 16 is received on the cylindrical seat face 29 which represents the outer face of the second bearing journal 14. The second bearing ball 16, by means of an end face, is contactingly held against a shoulder 30 of the second bearing journal 14. The second bearing ball 16 is axially secured along the axis 15 at the second bearing journal 14 by deformation regions 31 distributed along the circumference of the second bearing journal 14 in the region of the end face. The deformation regions 31 lead to an accumulation of material in the region of the other end face of the second bearing ball 16.

Furthermore, with reference to the second bearing race 26 it can be seen that the hollow-spherical bore 32, with its center on the longitudinal axis 37 of the second bearing race 26, is offset away from the end face 35 towards the end face 36. As a result, a collar is obtained towards the end face 35. In the region of the end face 36, the hollow spherical bore 32 ends in a circular-shaped aperture. In consequence, in the region of the end face 36, a sufficiently large articulation relative to the second bearing journal 14 and the second bridge 13 is achieved in order to ensure the desired large articulation angle. The collar formed towards the end face 35 provides the second bearing race 26 with the required stiffness. In this region, sufficient free space exists which enables the second bearing ball 16 to project beyond the end face 35 under articulation conditions.

Furthermore, it can be seen that the second bearing race 26 includes a cylindrical outer face 33 which includes a continuous groove 34. The second bearing race 26 is displaceably supported by the cylindrical outer face 33 in the bearing bore 24 of the guiding projection 23. The longitudinal axis 37, on which the hollow spherical bore 32 is centered, simultaneously forms the axis on which the cylindrical outer face 33 and thus the bearing bore 24 are centered. The first bearing ball 6 and the first bearing journal 4 are designed and arranged as described above in connection with the second bearing ball 16 and the second bearing journal 14.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A centered double universal joint comprising:
   a first outer joint yoke with two first yoke arms and a first bridge connecting the two first yoke arms, said bridge carrying a first cylindrical bearing journal;
   a first inner joint yoke including a first bearing housing portion;
   a first cross member articulatably connecting the first outer joint yoke to the first inner joint yoke;
   a second outer joint yoke with two second yoke arms and a second bridge connecting the two second yoke arms, said second bridge carrying a second cylindrical bearing journal;
   a second inner joint yoke including a second bearing housing portion, said second bearing housing portion connected to the first bearing housing portion forming an annular guiding recess;
   a second cross member articulatably connecting the second outer joint yoke to the second inner joint yoke;
   a guiding disc having a central guiding projection projecting from the guiding disc on both sides towards the first and the second bearing journal, a continuous cylindrical bearing bore in said guiding projection into which the two bearing journals extend from different ends, said guiding disc being adjustable in the guiding recess;
   one bearing ball per bearing journal, each bearing ball having the shape of a spherical zone and including a through-bore, said through-bore positioning said bearing balls on the bearing journals, said bearing balls held at least axially with reference to an axis of the bearing journals, and said bearing ball including a spherical outer face; and
   one bearing race per bearing ball, each bearing race supporting the spherical outer face of the bearing ball in a corresponding hollow-spherical bore enabling said bearing ball to pivot in all directions, and said bearing ball and bearing race forming a pre-assembled unit, said bearing race including a cylindrical outer face adjustably positioned in the cylindrical bearing bore of the guiding disc.

2. A centered double universal joint according to claim 1, wherein during assembly of the bearing race, the bearing ball is pressed into the hollow-spherical bore in the bearing race with the axis of its through-bore extending perpendicularly relative to the longitudinal axis of the cylindrical outer face of the bearing race.

3. A centered double universal joint according to claim 1, wherein the bearing race is axially delimited by two end faces and a longitudinal axis centers the cylindrical outer face and the hollow-spherical bore is eccentrically arranged between the two end faces along said longitudinal axis.

4. A centered double universal joint according to claim 1, wherein the two bearing housing portions are bolted to one another.

5. A centered double universal joint according to claim 1, wherein annular guiding plates are arranged on both sides of the guiding disc in the annular guiding recess and the guiding recess is closed on the radial outside and open on the radial inside, an outer diameter of the guiding plates is greater than the inner diameter of the guiding recess and smaller than the greatest diameter of the guiding recess and an inner diameter of the guiding plates is greater than the outer diameter of the guiding projection of the guiding disc and smaller than the outer diameter of the guiding disc.

6. A centered double universal joint according to claim 1, wherein the bridge forms an integral part of the associated outer joint yoke.

* * * * *